United States Patent [19]
Simmons et al.

[11] Patent Number: 5,382,068
[45] Date of Patent: Jan. 17, 1995

[54] EASILY INSTALLED FLEXIBLE BARRIERS FOR VANS

[76] Inventors: Michael L. Simmons, 8561 Blackfoot Ct., Lorton, Va. 22079; Robert J. Goldsborough, 7627 Matera St., #3, Falls Church, Va. 22043

[21] Appl. No.: 164,991

[22] Filed: Dec. 9, 1993

Related U.S. Application Data

[63] Continuation of Ser. No. 45,110, Apr. 12, 1993, abandoned.

[51] Int. Cl.⁶ ............................................. B60R 27/00
[52] U.S. Cl. ................... 296/24.1; 160/327; 160/333
[58] Field of Search .............. 296/24.1, 138, 141, 296/77.1, 98; 160/333, 349.1, 349.2, 350, 368.1, 327, 354, DIG. 16, DIG. 18, 330; 410/129, 151, 152; 16/87.2

[56] References Cited

U.S. PATENT DOCUMENTS

| | | | |
|---|---|---|---|
| 1,110,857 | 9/1914 | Applas | 296/141 |
| 1,852,729 | 4/1932 | White | 16/87.2 |
| 3,632,154 | 1/1972 | Woodrich | 296/24.1 |
| 4,100,957 | 7/1978 | Shelton | 160/DIG. 18 |
| 4,366,977 | 1/1983 | Davis | 296/24.1 |
| 4,621,856 | 11/1986 | McKenzie | 296/24.1 |
| 4,652,037 | 3/1987 | Thau et al. | 296/77.1 |
| 4,720,222 | 1/1988 | Nagy et al. | 410/151 |
| 4,738,480 | 4/1988 | Ward | 296/37.6 X |
| 4,938,518 | 7/1990 | Willemsen | 296/24.1 |
| 4,991,522 | 2/1991 | Alexander | 296/98 X |
| 5,054,837 | 10/1991 | Chapman | 296/24.1 |
| 5,148,580 | 9/1992 | Dycrow | 160/349.2 |
| 5,238,282 | 8/1993 | Watson et al. | 296/24.1 |
| 5,246,261 | 9/1993 | McCormack | 296/24.1 |

FOREIGN PATENT DOCUMENTS

| | | | |
|---|---|---|---|
| 0508818 | 10/1992 | European Pat. Off. | 296/24.1 |
| 404791 | 7/1943 | Italy | 296/24.1 |
| 0179554 | 7/1990 | Japan | 296/24.1 |

*Primary Examiner*—Dennis H. Pedder
*Attorney, Agent, or Firm*—Laurence R. Brown

[57] ABSTRACT

A form fitting flexible sheet van barrier wall is held in place by reusable adhesive strips as a dust sealing thermal barrier for mounting behind the driver compartment of a van to divide the van into driving and working compartments. The sheet may be rolled up and stored adjacent the van roof. The flexible sheet carries a window which may be opened to permit the flow of air between the compartments. Also weight bearing accessories are provided on the sheet for storing items such as coat hangers and work tools. The barrier comes in an assembly manually retrofittable to vans without tooling or van modification.

8 Claims, 3 Drawing Sheets

EASILY INSTALLED FLEXIBLE BARRIERS FOR VANS

This application is a continuation, of application Ser. No. 08/045,110, filed Apr. 12, 1993, now abandoned.

TECHNICAL FIELD

This invention relates to accessories for vans, and more particularly it relates to thermal barriers for confining heat and air conditioning in a driver compartment to more efficiently use heaters and air conditioners.

BACKGROUND ART

Prior art thermal barriers are known for dividing a van into separate driver and work compartments so that the heater and/or air conditioner will be more effectively used for the comfort of the occupants of the driver compartment. For example consider Paul F. Woodrich, U.S. Pat. No. 3,632,154, Jan. 4, 1972 for Heat-Retaining Partition for Automotive Van. There are many deficiencies to such prior art barrier systems, which must depend upon a critical transparent material that will fold itself against sidewalls and can be hung by adhesive to a permanently installed crossarm built into the van. The barrier material also must be held down by heavy magnets that must adhere to a metallic van floor, which is not always available at preferred locations. Also the weight of the magnets tend to rupture the retaining "Velcro" adhesive attachment strip to the top crossarm. Nor is any facility provided for storage of the barrier in the van when not in use during comfortable weather.

William P. McKenzie, U.S. Pat. No. 4,621,856, Nov. 11, 1986 for Mountable and Demountable Partition Structure for Motor Vehicles provides permanently installed frames for moving in and out a replaceable transparent plate barrier. This barrier interferes with the van side door opening dimensions and reduces work space in the working compartment.

Jeffrey L. Ward, U.S. Pat. No. 4,738,480, Apr. 19, 1988 for Van Body Conversion provides a permanent framework conversion for holding in place a bolted in solid wall barrier in a modified van body. If the barrier is removed, residual framework of the modified van body would interfere with van usage.

James A. Williamson, U.S. Pat. No. 4,938,518, Jul. 3, 1990 for Vehicle Partition Assembly provides flexible strips suspended from an upper framework permanently installed in a modified van for permitting objects to pass through the barrier.

It is the objective of the present invention to provide an improved van barrier system with features not available in the aforesaid systems, including the feature of simplified installation without tools or van modification, which is not provided by the prior art.

Also objectives of this invention include providing an easily removable barrier and a barrier system that serves as a work organizer.

DISCLOSURE OF THE INVENTION

An improved thermal barrier for a van as afforded by this invention may be installed without the necessity of tooling and without modification of the van.

This invention also provides in addition to elimination of any van modifications or use of tools for installation of the barrier improved features for a van barrier wall including peripheral sealing to provide a dust barrier between the compartments, in-van storage of the barrier wall when not in use, integrated work organizing accessories for storing clothing, tools, maps and the like, and manual control of optional air circulation between driver and work compartments.

BRIEF DESCRIPTION OF THE DRAWINGS

In the accompanying drawings, wherein like reference characters refer to similar features throughout the several views to facilitate comparison.

THE PREFERRED EMBODIMENT

Figure 1:
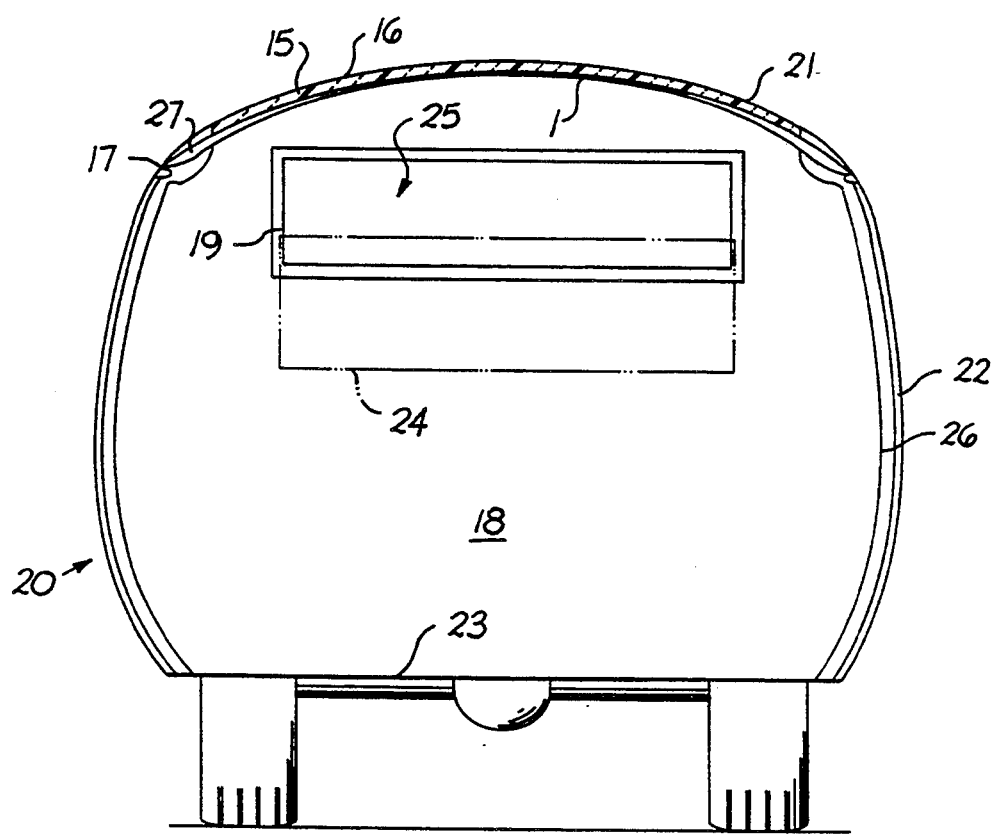
FIG. 1 is a rear section view of a van body having a barrier as provided by this invention.

As may be seen from the rear of van 20, a barrier panel 18, with window opening 19 is seen which resides just behind the driver compartment seat (not shown). This barrier panel 18 is closely fit and sealed to the roof 21, the sidewalls 22 and the floor 23 to provide a dust barrier when the window opening 19 is closed by an attached window pane 24. The window pane is shown in phantom since it is removable and positionable to admit through an opening 25 of desired area flow of air between driver and work compartments formed by the barrier 18 when desired.

Figure 2:
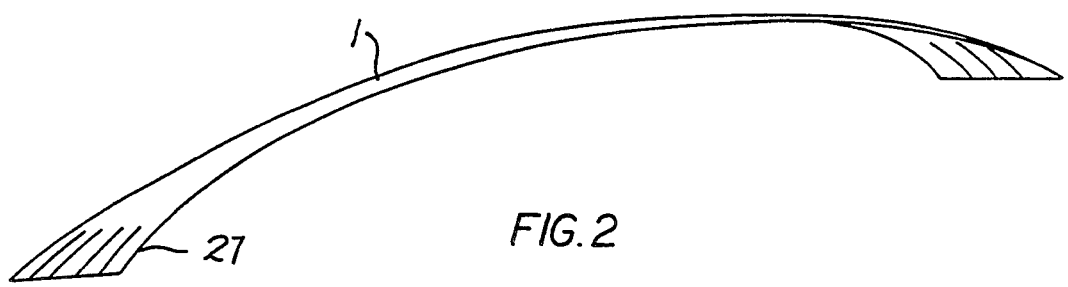
FIG. 2 is a perspective view of a cross brace member for removably mounting the barrier in the van without the necessity of tooling or van modification.

The upper edge of the barrier 18 is attached to a crossbeam 1, seen in perspective in FIG. 2. It is noted that interior van bracing 26 provides an upper ridge 17 on either side. Into this ridge the ends 27 of the cross brace 1 are frictionally inserted by twisting the brace I from a skewed position adjacent the van roof 21 to a transverse resident position with the ends frictionally secured in the ridges 17 on opposite sidewalls. The brace is typically formed from sixteen gage steel plate, and has adhered to its upper surface a foam insulation layer 15 that absorbs vibrations and prevents chattering by means of compressive contact with the roof 21 inside the van.

The barrier 18 is of a flexible fabric material preferably canvas or vinyl. The window 24 is of a flexible transparent material such as used in convertible automobile tops. The window 24 is held in place adjacent the window opening 19 by reusable adhesive strips made of "Velcro" or functionally equivalent reusable adhesive layers.

Figure 3:
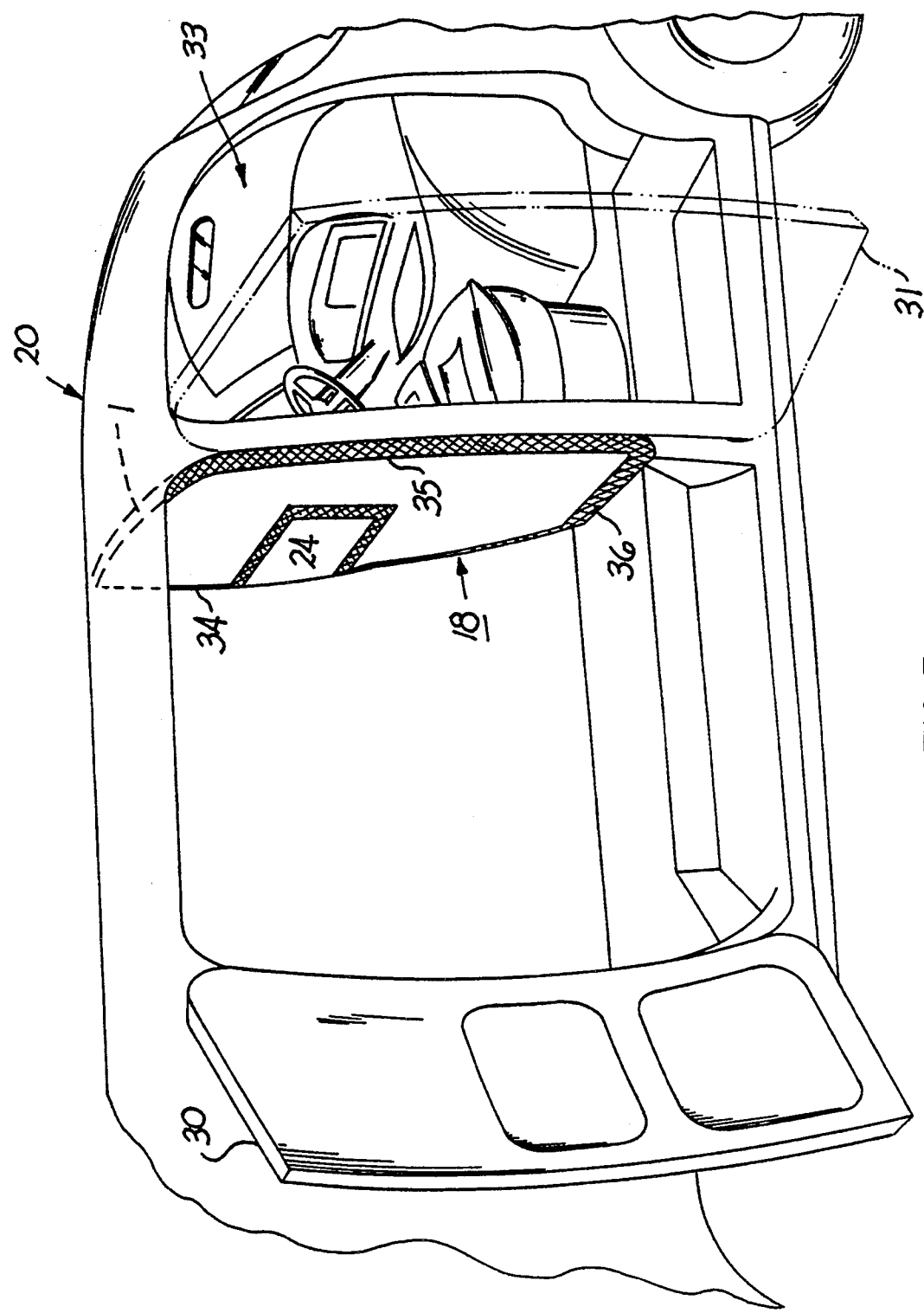
FIG. 3 is a side perspective view of a van with open doors showing the internal barrier.

As seen from FIG. 3, with doors 30 and 31 open for viewing inside the van, the barrier 18 is shown mounted just behind the driver compartment 33. The adhesive strips of "Velcro" etc are shown about the window 24 by reference character 34 and about the sides and bottom respectively of the flexible sheet barrier 18 by reference characters 35, 36. They adhere to upholstery or mating adhesive strips mounted on the van floor and walls, constituting the only modification necessary to install the system in the van.

Figure 4:
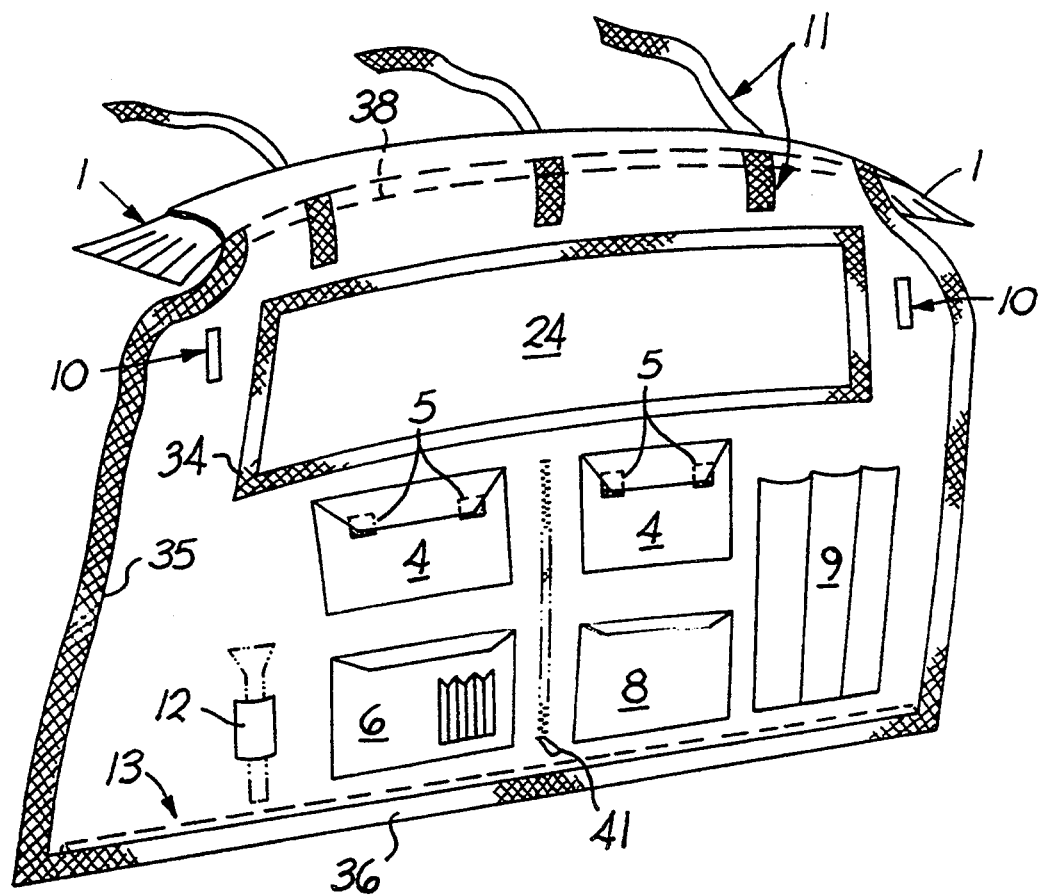
FIG. 4 is a sketch of the barrier kit which may be installed in the van without the need for conversion or tools.

In the view of FIG. 4, the barrier assembly is shown ready to install in the van without tools or van modification, provided that the adhesive strips 35 and 36 are compatible with the sides and the bottom of the van.

Otherwise, the mounting of mating adhesive strips on the van walls and floor is simply done without tooling.

Furthermore the canvas or vinyl sheet material affords the capability of carrying integrated accessories for storing objects. Thus, this view shows the storage pouches 4, sealed closed by adhesive strips 5, The clip board pouch 6, the pencil pouches 7, the map pocket 8 and storage pouch with deeper pockets 9 for storing blueprints. Also shown are coat hangers 10. Any loading is possible because the flexible barrier material is firmly attached to the crossbar assembly 1 by means of a hem 38 in the fabric or the like to provide a load bearing mount when the crossbar 1 is wedged into place.

For storage in-situ in the van, when not in use, the inserted iron rod 13, or the like, inside a bottom hemline serves as a ballast weight to hold the material taut and planar. The rod also serves as a roller for neatly rolling up the barrier for storage adjacent the roof brace 1 where the adhesive straps 11 hold it in stored position.

For access between the compartments, the fabric sheet 18 has a zipper 40 installed under windowframe 34, for access from either compartment by way of handle 41 extending from both front and back of the fabric sheet 18. Also, the accessory packets and hangers may be mounted on either side of the fabric.

From the foregoing it is recognized that this invention has advanced the state of the art, and therefore the following claims set forth those novel features embodying the spirit and nature of the invention.

We claim:

1. A partition adapted to fit between van sidewalls from roof to floor for isolating a driver compartment of a van from a rear work compartment, comprising in combination,
    a weight bearing crossbar brace formed solely of a frictionally insertable bar positioned to hug the roof contour of the van being secured solely with a frictional fit to reside transversely between van sidewalls adjacent the van roof on respective supporting van ridges for stably anchoring the brace in place,
    a compressible insulation layer adhered to the crossbar in compression with the van roof to absorb vibration and chatter,
    a flexible fabric sheet attached to the brace in a weight supporting joint to extend downwardly from the brace as a partition wall for fitting between the van sidewalls from floor to roof and provided with a window opening permitting viewing into the rearwork compartment from the driver compartment,
    fastening means adapted to secure the sheet releasably to van sidewalls and floor,
    a transparent window overlay securable to said sheet at said window opening, and
    manually operable adjusting means for optionally fully closing or partly opening said window opening with said window overlay to permit a selectable amount of air to pass between the driver compartment and rear work compartment.

2. The partition defined in claim 1 further comprising a set of accessory attachments affixed to the sheet for storing a variety of objects on the barrier wall including tools.

3. The partition defined in claim 1 wherein said window overlay incorporates said manually operable adjusting means, by means attached thereto comprising removable and reusable adhesive strips for adhering to said fabric sheet and thereby holding the window in variable positions on the sheet, thereby permitting the window overlay to be removed and to be placed manually into optional positions to fully and to partly cover the window opening.

4. The partition defined in claim 1 further comprising a zipper in the sheet for permitting access between the two compartments.

5. A removably insertable flexible mounting fixture adapted to be wedged into place and supported by ridges on van sidewalls adjacent a van roof for use in supporting a flexible barrier sheet extending from roof to floor for isolating a driver compartment of a van from a rear work compartment, comprising in combination:
    a sturdy weight bearing metal crossbar brace for supporting said barrier sheet in a weight bearing relationship, said brace being of fixed length and curved to hug the roof contour of the van, means comprising opposite end structure integrally formed on the brace for flexibly and frictionally conforming into to be firmly retained by ridges formed on opposite sides of the van when the brace is twisted from a skewed installation position adjacent the van roof to a transverse resident mounted position with the integral end structure frictionally secured in the ridges as the sole fastening means, thereby enabling the brace to support weight imposed by the flexible barrier.

6. The mounting fixture defined in claim 5 further characterized by chatter and vibration damping means for reducing vibration and chatter induced by said mounting fixture when in place in a van comprising a foam insulation layer attached to the upper surface of said crossbar brace for contacting the roof as an absorption medium to absorb vibration and prevent chattering of the mounting fixture by means of compressive contact with the van roof, said medium having a thickness providing compressive contact with the roof by wedging between the crossbar brace and the roof for absorbing said vibrations and preventing said chattering when the crossbar brace is installed.

7. The mounting fixture defined in claim 6 in combination with a flexible barrier sheet attached to the crossbar, and a plurality of weight bearing storage pouches on said barrier sheet for storage of objects whose weight is to be supported by the crossbar.

8. The combination of claim 7 wherein said barrier sheet comprises a hem into which the crossbar brace is inserted.

* * * * *